United States Patent
Zhou et al.

(10) Patent No.: US 10,652,860 B2
(45) Date of Patent: May 12, 2020

(54) RESOURCE UNIT ALLOCATION FOR ORTHOGONAL-FREQUENCY-DIVISION MULTIPLE ACCESS COMMUNICATIONS

(71) Applicant: HEWLETT PACKARD ENTERPRISE DEVELOPMENT LP, Houston, TX (US)

(72) Inventors: Qiang Zhou, Beijing (CN); Jianpo Han, Beijing (CN); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/906,159

(22) Filed: Feb. 27, 2018

(65) Prior Publication Data

US 2019/0268880 A1    Aug. 29, 2019

(51) Int. Cl.
| | |
|---|---|
| *H04W 72/04* | (2009.01) |
| *H04B 17/318* | (2015.01) |
| *H04L 5/00* | (2006.01) |
| *H04J 11/00* | (2006.01) |
| *H04W 84/12* | (2009.01) |

(52) U.S. Cl.
CPC .......... *H04W 72/04* (2013.01); *H04B 17/318* (2015.01); *H04J 11/0066* (2013.01); *H04L 5/0062* (2013.01); *H04L 5/0007* (2013.01); *H04W 84/12* (2013.01)

(58) Field of Classification Search
CPC ..... H04W 72/04; H04W 84/12; H04W 24/08; H04W 24/10; H04W 88/04
See application file for complete search history.

(56) References Cited

U.S. PATENT DOCUMENTS

| 7,539,123 B2 | 5/2009 | Rhodes |
| 9,014,128 B2 | 4/2015 | Lo et al. |
| (Continued) | | |

FOREIGN PATENT DOCUMENTS

| CN | 103369536 A | 10/2013 |
| CN | 103095633 B | 3/2016 |

OTHER PUBLICATIONS

Boris Bellalta, "Introduction to 802.11ax High-Efficiency Wireless," White Paper, Jul. 24, 2017, pp. 1-11 [online], National Instruments, Retrieved from the Internet on Jan. 24, 2018 at URL: <ni.com/white-paper/53150/en/>.

(Continued)

*Primary Examiner* — Anez C Ebrahim
(74) *Attorney, Agent, or Firm* — Hewlett Packard Enterprise Patent Department

(57) ABSTRACT

An example method of controlling a wireless access point may include causing the wireless access point to identify any groupings of contiguous non-protocol FFT bins of a wireless channel in which all of the non-protocol FFT bins in the grouping have respective signal strength values exceeding a first threshold, and a bandwidth of the grouping does not exceed a second threshold. The method may also include causing the wireless access point to identify any resource units of the wireless channel that overlap with any of the identified groupings. The method may also include causing the wireless access point to, in allocating the resource units to client devices for an OFDMA communication, skip the identified resource units.

20 Claims, 6 Drawing Sheets

(56) References Cited

U.S. PATENT DOCUMENTS

| | | | |
|---|---|---|---|
| 9,072,107 B2 | 6/2015 | Gauvreau et al. | |
| 9,491,773 B2 | 11/2016 | Gaal et al. | |
| 9,642,154 B2 | 5/2017 | Makhlouf et al. | |
| 2005/0164642 A1 | 7/2005 | Roberts | |
| 2010/0182972 A1* | 7/2010 | Katayama | H04W 72/048 370/329 |
| 2017/0099670 A1* | 4/2017 | Bhattacharya | H04L 43/16 |
| 2018/0109605 A1* | 4/2018 | Stephens | H04L 67/1008 |

OTHER PUBLICATIONS

K. Fazel, "Narrow-Band Interference Rejection in Orthogonal Multi-Carrier Spread-Spectrum Communications," Third Annual International Conference on Universal Personal Communications, Abstract, 1994, pp. 1-3 [online], Retrieved from the Internet on Aug. 21, 2017 at URL: </ieeexplore.ieee.org/document/383042/>.

European Search Report and Search Opinion Received for EP Application No. 19157872.3, dated Jul. 15, 2019, 7 pages.

\* cited by examiner

US 10,652,860 B2

RESOURCE UNIT ALLOCATION FOR ORTHOGONAL-FREQUENCY-DIVISION MULTIPLE ACCESS COMMUNICATIONS

BACKGROUND

A wireless channel may be used for conveying wireless communications between an access point and client devices. Various wireless communications techniques may be used to increase the number of distinct data signals that may be concurrently carried on the wireless channel between the access point and client devices. For example, orthogonal-frequency-division (OFD) techniques may divide an available system bandwidth into multiple orthogonal frequency sub-bands (aka subcarriers) and concurrently transmit multiple distinct data signals via the frequency sub-bands, respectively.

DETAILED DESCRIPTION

Figure 1:
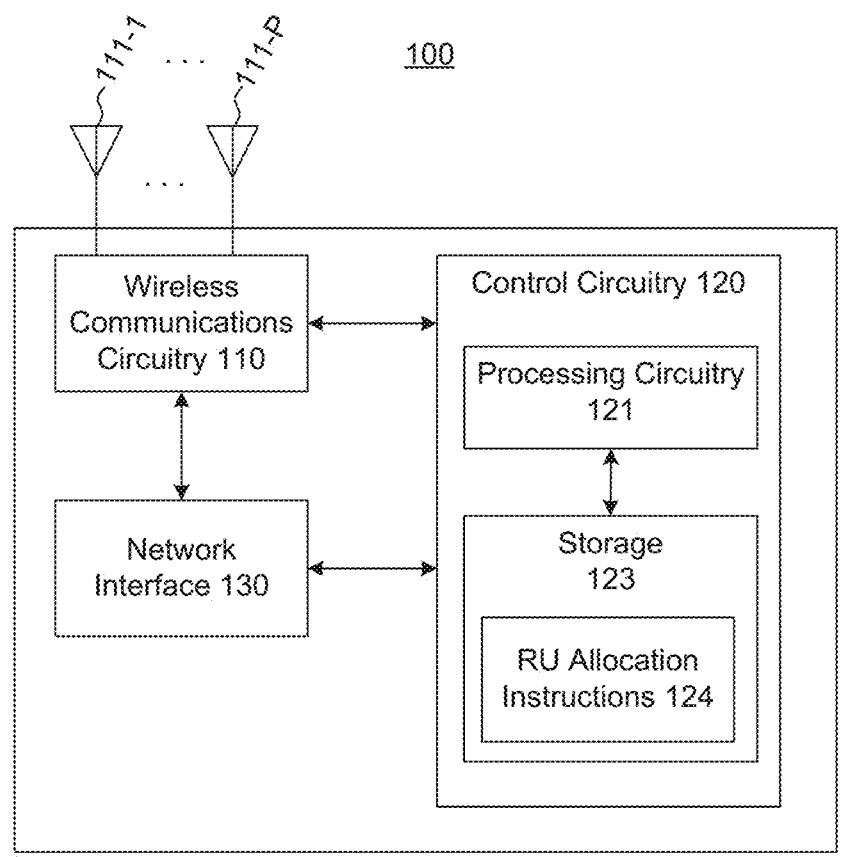
FIG. 1 is a block diagram illustrating an example wireless access point.

One type of OFD technique is orthogonal-frequency-division multiple access (OFDMA), in which data signals that are associated with different users may be transmitted simultaneously on the same wireless channel by assigning them to different subcarriers. In particular, for each OFDMA downlink data transmission frame, a wireless access point ("AP") may assign subcarriers of the wireless channel to one or more users, and may transmit data streams to those users using their respectively assigned subcarriers. Similarly, in some examples, for each OFDMA uplink data transmission frame, the AP may assign subcarriers of the wireless channel to one or more users, and may instruct the selected users to transmit their data streams using their respectively assigned subcarriers. The AP may use any algorithm to select the users that are to receive or transmit, and may use any algorithm to allocate the subcarriers amongst the selected users. The numbers and identities of users that are selected to receive transmission may vary from frame to frame, the subcarriers that are allocated to a given user may vary from frame to frame, and users do not necessarily have equal allocations of subcarriers in each frame or even in the long run.

In some OFDMA implementations, such as for example in 802.11 ax wireless access points, a wireless channel may be divided into non-overlapping groups of subcarriers called resource units ("RU"), where each RU includes a predefined number of subcarriers. In these examples, subcarriers are assigned to users in units of RUs, i.e., if a user is assigned an RU, it is assigned all of the subcarriers in the RU.

In examples described herein, an AP may monitor the wireless channel in real time to detect narrow band interference, and when an AP is assigning RUs to users the AP may skip (i.e., not assign to any user) any RU if that RU contains such narrow band interference. Although skipping such an RU may reduce the number of subcarriers that are usable in a given frame, it can nonetheless improve the overall throughput (i.e., amount of data that is successfully communicated per unit time) in the long run. In particular, when an RU that includes some narrowband interference is used for transmissions, some of those transmissions may fail, which may result in the transmission needing to be re-sent. In some cases, the entire frame may need to be re-sent, even if the interference affects only some of the subcarriers. Such frame retries may be extremely costly in terms of throughput. By skipping the RUs with narrowband interference, such frame retries may be avoided, thus increasing throughput.

More specifically, example APs described herein may detect narrow band interference by monitoring and analyzing Fast-Fourier-Transform (FFT) bin data, which may be provided, for example, by a radio chip of the AP. In particular, in examples described herein, narrow band interference may be defined as any grouping of one or more contiguous non-protocol FFT bins in which (A) all of the non-protocol FFT bins in the grouping have respective signal strength values exceeding a first threshold, and (B) a bandwidth of the grouping does not exceed a second threshold. Thus, the example APs may periodically identify any RUs that overlap with such a grouping of contiguous non-protocol FFT bins that satisfy the criteria noted above, and the AP may skip the identified RUs when allocating the RUs to client devices for an OFDMA communication. The AP may determine whether an RU overlaps with a grouping of bins by determining whether a start frequency or an end frequency of the grouping is between a start frequency and an end frequency of the RU.

As used herein, protocol FFT bins are those that contain signals that utilize one of a number of specified protocols, while non-protocol FFT bins are those that contain signals that do not use one of the specified protocols. The specified protocols may include, for example, the specific protocol that the AP is designed to use, as well as other protocols that are compatible with the protocol used by the AP. For example, in an 802.11ax AP, the protocol FFT bins may be those that contain WiFi signals (i.e., signals that comply with one of the 802.11 family of protocols), while the non-protocol FFT bins may be those that contain non-WiFi signals. As another example, in a Long-Term Evolution (LTE) AP (aka an EnodeB), the protocol FFT bins may be those that contain LTE signals (i.e., signals that use, or are compatible with, the Evolved Universal Terrestrial Radio Access (E-UTRA) protocol), while the non-protocol FFT bins may be those that contain non-LTE signals.

Below, examples will be described from the perspective of downlink transmissions from an AP to client devices, for ease of description. However, it should be understood that, in some examples, uplink transmissions from client devices to an AP may also be subject to the operations described herein. In particular, whether the transmissions are downlink or uplink, the AP will still control which users will be allocated which RUs for OFDMA data frames.

1. Wireless Access Points—Detailed Example

FIG. 1 illustrates an example wireless access point ("AP") 100. The AP 100 may be any OFDMA capable communications device that is to act as an access point for a client device 200. Specifically, the AP 100 may allow client devices 200 that are wirelessly connected thereto to communicate with one another and/or an external network (such as the network 300) via various communications standards.

As used herein, "access point" (AP) can refer to a networking device that allows a client device to connect to a wired or wireless network. The term AP can, for example, refer to receiving points for any wireless access technology which is now known or may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

An AP may provide access to a wireless network, such as a Wireless Local Area Network (WLAN). As used herein, a WLAN can, for example, refer to a communications network that links two or more devices using some wireless distribution method (for example, spread-spectrum or orthogonal frequency-division multiplexing radio), and also usually providing a connection through an AP to the Internet. Thus, a WLAN may provide users with the mobility to move around within a local coverage area and still stay connected to the network.

An AP may include one or a plurality of radios. As used herein, a radio refers to hardware on an AP to receive signals and transmit the received signals to other components within the AP. The radio of an AP may receive signals from within the WLAN, such as wireless signals, or the radio may receive external signals, such as from sources outside the WLAN.

The AP 100 may include wireless communications circuitry 110, control circuitry 120, and a network interface 130. The wireless communications circuitry 110 may wirelessly transmit messages to client devices, such as the client devices 200 illustrated in FIG. 2. The wireless communications circuitry 110 may also receive messages wirelessly transmitted from the client devices 200. The network interface 130 may connect the AP 100 to a network, such as the network 300 illustrated in FIG. 2. The control circuitry 120 may control the wireless communications circuitry 110. The control circuitry 120 may also control the network interface 130.

In some examples, all of the operations of the AP 100 may be controlled by the control circuitry 120 (e.g., the AP 100 may be a so-called "fat" AP). In other examples, some or all of the operations of the AP 100 may be controlled by an external controller 500 (described in the next section), and in some such examples, the control circuitry 120 may play a diminished role or be omitted entirely (e.g., the AP 100 may be a so-called "thin" AP). In other examples, the AP 100 may be a node of a distributed system, together with other APs, that forms a virtualized controller that controls some or all operations of each AP in the system. In the remainder of this section, it will be assumed for the sake of convenience that all of the operations of the AP 100 are controlled by its own control circuitry 120; however, it should be understood that in practice some or all of the operations could be performed by other entities (such as an external controller or other AP in a distributed control system).

The wireless communications circuitry 110 includes P antennas 111 (111-1 through 111-P), where P is an integer equal to or greater than one. The antennas 111-1 through 111-P may transmit and/or receive signals in the form of electromagnetic radiation. Any portion of the electromagnetic spectrum may be used to transmit/receive messages. A transport protocol adopted by the AP 100 may specify a particular portion of the electromagnetic spectrum for transmission/reception (for example, IEEE 802.11ax specifies 2.4 Ghz and 5 Ghz bands). The wireless communications circuitry 110 may include a wireless chipset.

The wireless communications circuitry 110 may utilize OFDMA communication techniques to transmit and/or receive messages. In addition, the wireless communications circuitry 110 may utilize additional types of communication techniques, including, for example, multi-user-multiple-input-multiple-output (MU-MIMO), single-user MIMO (SU-MIMO), single-input-single-output (SISO), multiple-input-single-output (MISO), OFD single-access (OFDSA), etc. For example, a transmission mode may be selected depending on a type of communication technology that a target client device 200 is capable of using. Although the AP 100 may be able to operate using any of the aforementioned techniques or combinations thereof (or using techniques not specifically mentioned), operations described herein chiefly pertain to communications that utilize OFDMA, and thus other modes of operation will not be described in greater detail herein.

More specifically, the wireless communications circuitry 110 may utilize OFDMA techniques to transmit multiple data signals concurrently (e.g., in a same transmission frame) via multiple orthogonal frequency sub-bands (sub-carriers) of the wireless channel, respectively. In addition, using OFDMA techniques, the concurrently sent data signals may be destined for multiple client devices 200. The wireless communications circuitry 110 may also combine the OFDMA techniques with any of the MU-MIMO, SU-MIMO, SISO, and MISO techniques.

The wireless communications circuitry 110 may generate data streams for transmission by packaging messages that are to be transmitted into transmission frames (e.g., MAC and PHY framing) according to the wireless transmission protocol adopted by the AP 100, mapping the transmission frames to transmission symbols according to a modulation scheme and modulating a carrier signal based on the transmission symbols, and wirelessly transmitting the modulated signals via amplifiers and the antennas 111-1 through 111-P. Examples of wireless transmission protocols include IEEE 802.11, IEEE 802.16, 3GPP E-UTRA, and the like. Examples of modulation schemes include quadrature amplitude modulation (QAM), phase-shift keying (PSK), frequency-shift keying (FSK), amplitude-shift keying (ASK), frequency-division multiplexing (FDM), orthogonal frequency-division multiplexing (OFDM), continuous phase modulation (CPM), and the like. Some wireless transmission protocols specify use of a particular modulation scheme; for example, IEEE 802.11ax specifies use of QAM modulation. The wireless communications circuitry 110 may include circuitry for generating the carrier signal such as an oscillator, a modulator for modulating the carrier signal, filters, amplifiers, and the like. The wireless communications circuitry 110 may also include precoding circuitry that applies weights to the P signals using beamforming techniques. The precoding weights may be determined by the control circuitry 120.

The wireless communications circuitry 110 may also receive wireless transmissions from client devices via the antennas 111-1 through 111-P, and may demodulate the received signals via demodulation circuitry to obtain reception frames. The wireless communications circuitry 110 may receive MU-MIMO, SU-MIMO, SISO, MISO, OFDMA, and/or OFDSA communications. Reception frames whose respective payloads are intended to go to the network 300 (e.g., data plane messages) may be sent to the network 300 via the network interface 130, while reception frames that include control plane messages may be sent to the control circuitry 120 for processing.

The wireless communications circuitry 110 may also generate FFT bin data for use by the control circuitry 120. For example, many commercially available wireless chipsets are able to generate such FFT bin data, and in some examples the wireless communications circuitry 110 may include such a wireless chipset. In examples in which the AP does not include a wireless chipset that generates such FFT bin data, the control circuitry 120 may determine the FFT bin data by periodically applying a FFT function to the received signals. In some examples, the FFT bins may be identified by the wireless chipset as being protocol bins or non-protocol bins; for example, a 802.11 wireless chipset may identify whether the signal represented in each bin is a WiFi signal (protocol bin) or a non-WiFi signal (non-protocol bin). In other examples, the control circuitry 120 may label the FFT bins as protocol or non-protocol bins; for example, bins that include signals that do not include identifying information specified by the relevant protocol may be labeled as non-protocol bins.

The control circuitry 120 may be configured to perform the operations described herein in relation to allocating RUs to client devices 200. More specifically, the control circuitry 120 may be configured to perform the operations of FIGS. 3 and/or 4. In addition, the control circuitry 120 may also control the operations of the wireless communications circuitry 110 and/or the network interface 130. The control circuitry 120 may also generate control plane messages to be sent to client devices 200 via the wireless communications circuitry 110, and may process control plane messages received from client devices 200.

The control circuitry 120 includes processing circuitry 121, and, in some examples, storage 123. The processing circuitry 121 may include a number of processors (physical or virtual), dedicated hardware, or any combination of these.

As used herein, a "processor" may include (or be virtualized from) any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc. In examples in which the processing circuitry 121 includes processors, the processors may be configured to perform operations described herein, such as some or all of the operations of FIGS. 3 and/or 4, as a result of executing machine readable instructions, such as the channel access instructions 124. In examples in which the processing circuitry 121 includes processors, the control circuitry 120 may also include the storage 123 (physical or virtual), which may store the machine-readable instructions that are executed by the processors. In addition, in examples in which the processing circuitry 121 includes processors, the processing circuitry 121 may include components that support the processors and/or provide additional functionality, such as caches, coprocessors, timing sources, etc.

Figure 3:
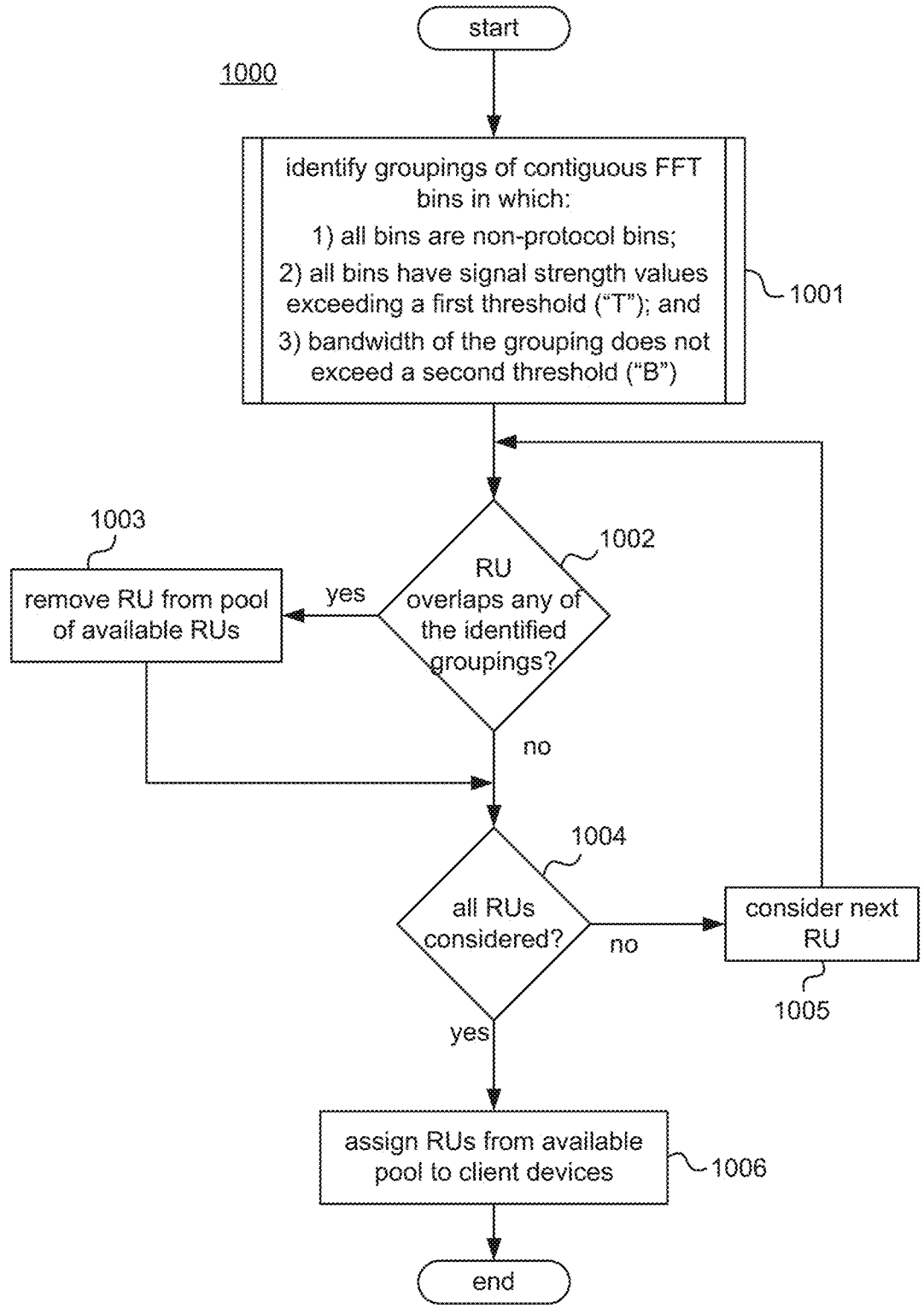
FIG. 3 is a process flow diagram illustrating an example process for allocating resource units to client devices.

In examples in which the processing circuitry 121 includes dedicated hardware, such dedicated hardware may include any circuitry that is configured to perform operations described herein, such as some or all of the operations of FIGS. 3 and/or 4. For example, dedicated hardware may include application-specific integrated circuits (ASICs), complex programmable logic devices (CPLD), and so on.

In some examples in which the processing circuitry 121 includes both processors and dedicated hardware, some or all of such additional hardware components may be integrated into a same integrated circuit as the processor. In particular, in some such examples, the processing circuitry 121 may be a system-on-chip (SoC).

As noted above, in some examples the control circuitry 120 includes the storage 123, which may store the RU allocation instructions 124. The storage 123 may include (or be virtualized form) any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.). The RU allocation instructions 124 may include instructions to perform some or all of the operations illustrated in FIGS. 3 and/or 4. In examples in which the processing circuitry 121 is constituted entirely by dedicated hardware, the storage 123 and the RU allocation instructions 124 may be omitted.

The network interface 130 connects the AP 100 to a network, such as the network 300. The network interface 130 includes at least one communications port that is connectable to the network, and may pass data between the wireless communications circuitry 110 and the network via the communications port. The network interface 130 may act as a hub, a bridge, a switch, a router, etc.

While the wireless communications circuitry 110, the control circuitry 120, and the network interface 130 are illustrated and described separately herein, this is merely for ease of explanation and does not imply that these components are necessarily physically or logically separated. For example, the wireless communications circuitry 110 and the control circuitry 120 may share one or more of the same processors and/or ASICs, such as a wireless transceiver chipset, and they may overlap with one another physically and/or functionally. Moreover, a particular operation may appropriately be described as being performed simultaneously by both the wireless communications circuitry 110 and the control circuitry 120, since the control circuitry 120 may control the wireless communications circuitry 110. For example, the wireless communications circuitry 110 may be said to modulate a carrier signal because it physically alters a parameter of the carrier signal, but the control circuitry 120 may also be said to modulate the carrier signal because it controls the wireless communications circuitry 110 in the modulation.

2. System Including an AP—Detailed Example

Figure 2:
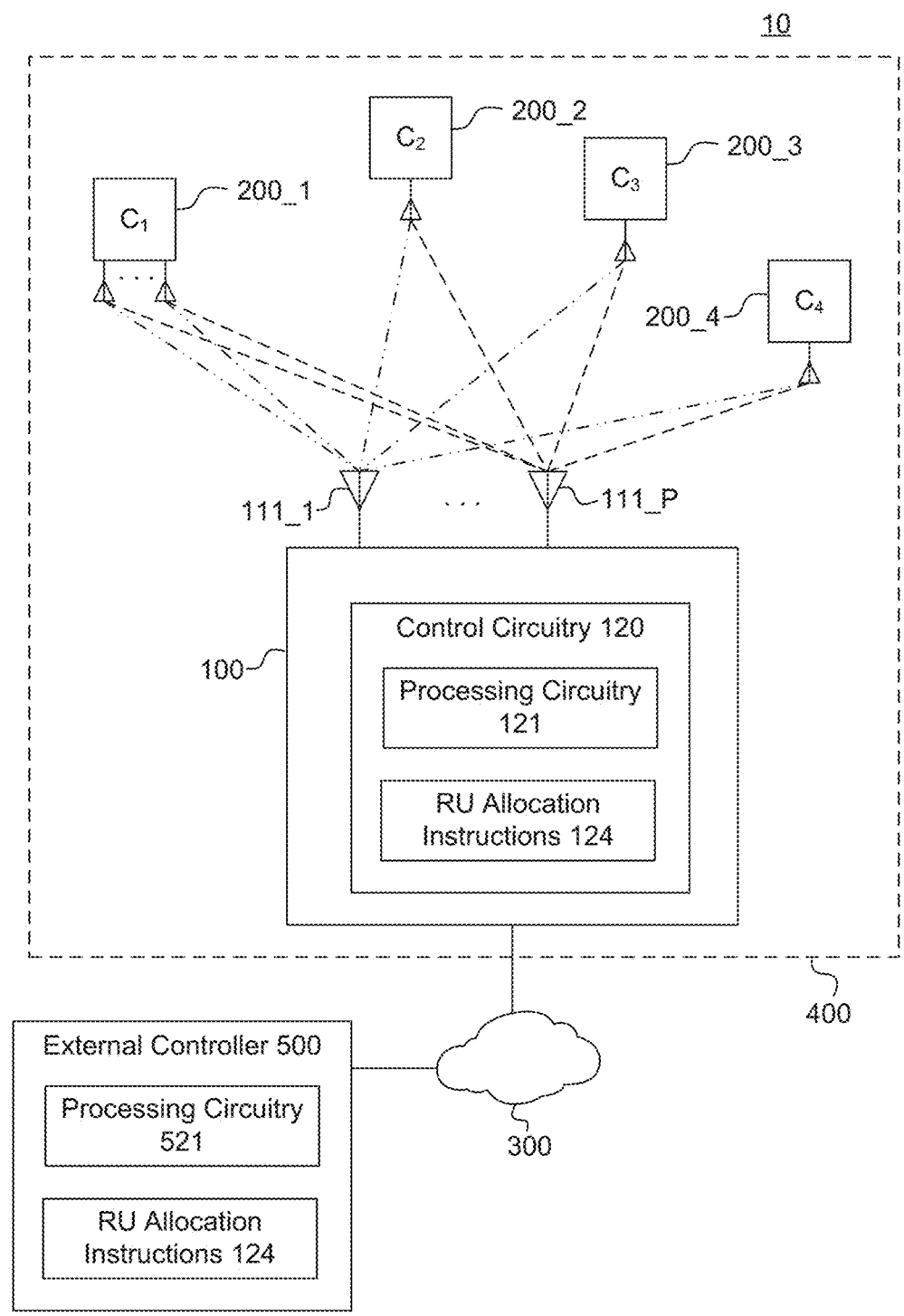
FIG. 2 is a block diagram illustrating an example system that includes an example wireless network with an example wireless access point and example client devices.

FIG. 2 illustrates an example system 10. The example system 10 includes an AP 100, client devices 200 (e.g., client devices 200_1-200_4), and an external network 300. In some examples, the system 10 may also include an external controller 500 that is communicably connected to the AP 100.

The AP 100 wirelessly communicates with the client devices 200, and may provide a connection between the client devices 200 and other computing devices via the external network 300. In some examples, the control circuitry 120 of the AP 100 may fully control the RU allocation processes described herein. However, in other examples, an external controller 500 may be included that controls some or all of the RU allocation processes described herein. In addition, in still further examples, the AP 100 may be a node of a distributed system, together with other APs, that forms a virtualized controller that controls some or all of the RU allocation processes described herein.

The client devices 200 may be any electronic devices that are capable of wirelessly communicating with the AP 100 via any communications protocol. For example, the client devices 200 may include mobile phones, tablets, laptop computers, personal-digital-assistants (PDAs), smart devices (e.g., smartphones, tablets, smart watches, smart bands, smart glasses, etc.), Bluetooth devices, internet-of-things (IoT) embedded devices, networking devices (e.g., wireless extenders, wireless bridges, etc.), and so on. In FIG. 2, four client devices 200, labeled $C_1$ through $C_4$, are illustrated, but it should be understood that any number of client devices 200 may be connected to the AP 100.

The network 300 may be any wired or wireless network, such as, for example, a local area network (LAN), a wide area network (WAN), the internet, a telecommunications backhaul network (such as the Evolved Universal Mobile Telecommunications System Terrestrial Radio Access Network (E-UTRAN) portion of an LTE network), a telecommunications core network (such as the Evolved Packet Core portion of an LTE network), and so on. The AP 100 and client devices 200 that are connected thereto may be referred to herein collectively as a wireless network 400.

2.1 Example Systems that Include an External Controller

In some example systems 10 that include an external controller 500, the external controller 500 may be an on-premises appliance (not illustrated) that is connected to and controls a collection of APs, including the AP 100. In some such examples, the external controller 500 may be connected between the AP 100 and the external network 300, such that data communications between the AP 100 and external network 300 pass through the external controller 500. Examples of such external controllers 500 include so-called WLAN Controllers and AP Controllers.

In other example systems 10 that include an external controller 500 (see FIG. 2), the external controller 500 may be an off-premises appliance that is connected to the APs via the network 300 (e.g., via the internet). For example, the external controller 500 may be a cloud appliance, which may be operated, for example, by a third party (e.g., a cloud service provider, the vendor of the AP 100, etc.).

In some examples in which an external controller 500 is provided (regardless of whether it is on-premises (e.g., a WLAN Controller) or off-premises (e.g., a cloud appliance)), the external controller 500 may include processing circuitry 521 that is configured to perform some or all of the RU allocation operations described herein. For example, the external controller 500 may include the RU allocation instructions 124, which when executed by a processor (physical or virtualized) of the external controller 500, cause it to perform the RU allocation operations. For example, the wireless communication circuitry 110 of the AP 100 may provide the FFT bins to the external controller 500, and then the external controller 500 may analyze the FFT bins (e.g., identify the groupings), identify the RUs to skip, and cause the AP 100 to skip the identified RUs.

In some examples, the control circuitry 120 of the AP 100 may still participate in some aspects of the RU allocation—for example, the external controller 500 may simply instruct the AP 100 which RUs to skip, and the control circuitry 120 may then decide on its own how to allocate the non-skipped RUs. In other examples, the external controller 500 may control every aspect of the RU allocation.

In some examples, in which an external controller 500 is provided, the control circuitry 120 of the AP 10 may be greatly diminished or even omitted entirely. In such examples, the AP 100 may be a so-called "thin" AP.

2.2 Example Systems that Include a Virtual Controller

As noted above, in some examples (not illustrated), the AP 100 may be a node of a distributed system, together with other APs. The distributed system may form a virtualized controller that controls all of the APs that are members of the distributed system. Thus, in such examples, control plane operations may be distributed across the processing circuitry of multiple APs, rather than each AP controlling just itself.

In such examples, some or all of the RU allocation processes described herein may be performed by the virtual controller. More specifically, one, some, or all of the APs in the system may include the RU allocation instructions 124. For example, the wireless communication circuitry 110 of the AP 100 may provide the FFT bins to the virtual controller, and then the virtual controller may analyze the FFT bins (e.g., identify the groupings), identify the RUs to skip, and cause the AP 100 to skip the identified RUs.

3. Processes for RU Allocation—Detailed Example

FIG. 3 illustrates an example process 1000 of allocating RUs to client devices as part of an OFDMA communication. The example process 1000 may be performed by control circuitry of an AP (such as the control circuitry 120 described above). The example process 1000 may also be performed by an external controller that controls an AP (such as the external controller 500 described above). The example process 1000 may also be performed by a virtual controller that controls an AP. For example, one or more processors included in the AP, an external controller, and/or another AP, may perform the process 1000 as a result of executing machine readable instructions corresponding to the operations described below (such as the RU allocation instructions 124). The entity that performs the process 1000 will be referred to below generically as a "controller", which should be understood broadly to include the control circuitry of an AP, an external controller, and/or a virtual controller.

Figure 5:
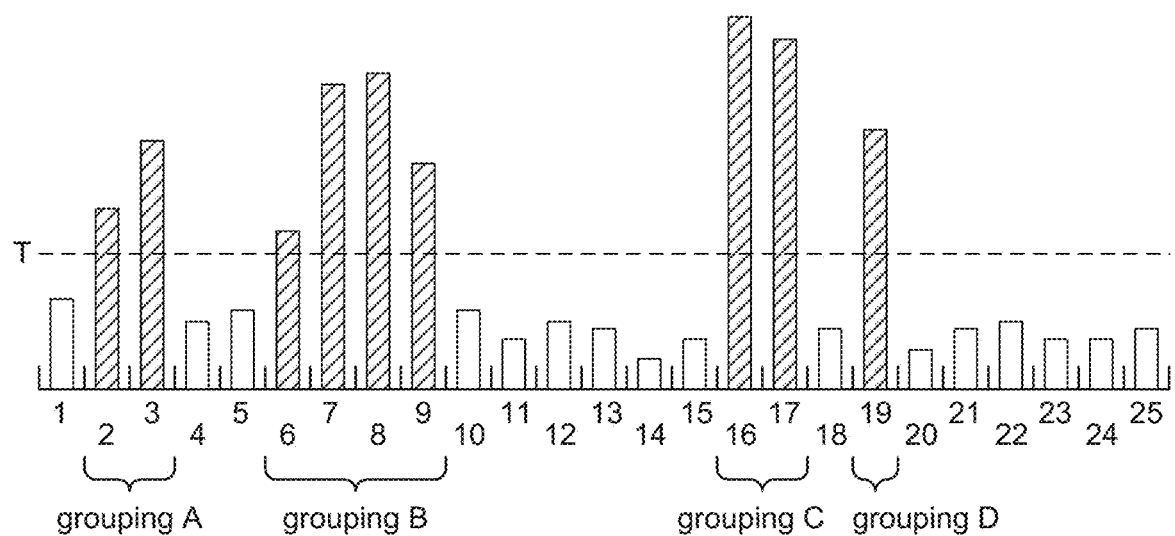
FIG. 5 is a graph illustrating hypothetical FFT bin data, with bin numbers on a horizontal axis and signal strength on a vertical axis.

In describing the process 1000 below, occasionally reference will be made to FIG. 5 to illustrate certain points. As noted above, FIG. 5 is a graph illustrating hypothetical FFT bin data, with bin numbers on the horizontal axis and signal strength on the vertical axis. In FIG. 5, a signal strength threshold T ("first threshold") is indicated by a dashed line, and those FFT bins whose signal strength exceeds T are indicated with hatching.

Turning now to the example process 1000, in block 1001, the controller may identify groupings of contiguous FFT bins in which: 1) all of the bins are non-protocol FFT bins, 2) all of the bins have signal strength values exceeding a first threshold ("T"); and 3) the bandwidth of the grouping does not exceed a second threshold ("B"). Such identified groupings may be considered as instances of narrowband interference.

"Contiguous" in this context means that there are not any FFT bins that are not members of the grouping located between any FFT bins in the grouping. For example, from the hypothetical FFT bin data illustrated in FIG. 5, the following are groupings that satisfy the first and second criteria noted above: [2, 3], [6, 7, 8, 9], [16, 17], and [19]. These groupings are indicated in FIG. 5 as groupings A-D. On the other hand, the grouping [16, 17, 19] is not a grouping of contiguous bins, because bin 18, which is located between bins 17 and 19, is not included in the proposed grouping.

The bandwidth of a grouping of FFT bins may be the difference between the frequency associated with the highest bin upper boundary and the frequency associated with the lowest bin lower boundary in the grouping. In some examples in which the FFT bins have uniform bin widths, the controller may determine the bandwidth of a grouping to be $G_i = n_i \cdot w_i$ where $G_i$ is the bandwidth of the $i^{th}$ grouping, $w$ is the bin width, and $n_i$ is the number of non-protocol FFT bins in the $i^{th}$ grouping. The controller may determine $n_i$ to be $n_i = Y - X + 1$, where Y is a bin number of a highest bin in the grouping and X is a bin number of a lowest bin in the grouping. The controller may determine the bin width $w_i$ to be $w_i = W/N$, where W is the bandwidth of the entire channel and N is the number of bins in the FFT bin data for the channel.

In cases in which a grouping of contiguous FFT bins that satisfy the first and second criteria is wholly subsumed by another grouping of contiguous FFT bins that satisfy the first and second criteria, the subsumed grouping(s) may be ignored and the larger grouping may be the one that is considered for compliance with the third criteria. For example, in FIG. 5, although each of the groupings [6, 7], [7, 8], [8, 9], [6, 7, 8], and [7, 8, 9] satisfy the first and second criteria noted above, all of these are wholly subsumed by the larger grouping [6, 7, 8, 9]; accordingly, in determining compliance with the third criteria, the AP may consider the grouping [6, 7, 8, 9] and ignore the subsumed groupings [6, 7], [7, 8], [8, 9], [6, 7, 8], and [7, 8, 9]. Thus, for example, if the second threshold B were equal to three bin widths (B=3w), then neither the grouping [6, 7, 8, 9] nor any of its subsumed groupings would be identified in block 1001, since their bandwidth exceeds B.

The third criterion noted above is intended to distinguish narrowband interference sources from broadband interference sources. In particular, groupings of contiguous non-protocol FFT bins that satisfy the first and second criteria but do not satisfy the third criteria may be considered as broadband interference. However, such broadband interference is not the subject of the present disclosure. Thus, broadband interference groupings are not identified in block 1001 for use in the subsequent operations of FIG. 3; however, this does not preclude the AP from identifying such broadband interference groupings for other purposes, such as for use in a broadband interference mitigation process.

In block 1002, the controller may consider a particular RU and determine whether the RU overlaps with any of the groupings that were identified in block 1001. If the RU overlaps with any of the groupings, then the process continues to block 1003, in which the RU is removed from a pool of available RUs. If the RU does not overlap with any of the groupings, then to process continues to block 1004.

In the determination of block 1002, the controller may determine that a given RU overlaps a given grouping if either the lowest frequency (group_start) or the highest frequency (group_end) associated with the grouping is located between the lowest frequency (RU_start) and the highest frequency (RU_end) of the RU. In other words, if either RU_start≤group_start≤RU_end or RU_start≤group_end≤RU_end, then the RU overlaps the group.

In some examples, the frequencies associated with the boundaries of the FFT bins are not necessarily specified in the FFT bin data output by the radio chip, in which case the controller may infer these frequencies from other information in order to perform the determination of block 1002. For example, the controller may determine the lowest frequency associated with an $i^{th}$ grouping (group$_i$_start) to be $$\text{group}_i\_\text{start} = (f_{center} - W/2) + X_i \cdot w \qquad \text{eq. (1)}$$

where is $f_{center}$ the center frequency of the channel and $X_i$ is the lowest bin number in the $i^{th}$ grouping. Furthermore, the controller may determine the highest frequency associated with a given grouping (group$_i$_end) to be $$\text{group}_i\_\text{end} = (f_{center} - W/2) + (Y_i + 1) \cdot w \qquad \text{eq. (2)}$$

where $Y_i$ is the highest bin number in the $i^{th}$ grouping. Equations 1 and 2 assume that the lowest FFT bin number is zero; however, if instead the lowest FFT bin number is one, then $X_i$ may be replaced by $X_i - 1$, and $Y_i + 1$ may be replaced by $Y_i$ in the equations.

As noted above, if the RU overlaps with any of the identified groups, then process 1000 continues to block 1003; otherwise, process 1000 continues to block 1004. In block 1003, the RU is removed from a pool of available RUs. When RU's are ultimately assigned to client devices, only RU's that are still included in the pool are available to be assigned. Thus, removing an RU from the pool is equivalent to "skipping" the RU during allocation. After block 1003, the process continues to block 1004.

In block 1004, the controller may determine whether all of the RUs have been considered. If so, the process continues to block 1006. If not the process loops back to block 1002, via block 1005, to consider a next RU.

In block 1006, RUs are assigned to client devices from the pool of available RUs. Specifically, only RUs that remain in the pool may be assigned to client devices. Any allocation algorithm may be used in block 1006 to assign the RUs to the client devices, as long as the algorithm skips the RUs that have been removed from the pool. The process then ends.

In some examples, some or all of the operations of FIG. 3 may be performed each time that RUs are to be allocated to client devices. For example, the entire process of FIG. 3 may be performed each time that an OFDMA communication is to be sent or received by the AP. As another example, the allocation of RUs to client devices (block 1006) may be performed every time that RUs are to be allocated, but other operations may be performed at different timings.

For example, some operations of FIG. 3 may be performed periodically at set intervals. For example, the identifying of FFT bin groupings (block 1001) and/or the identification of RUs that overlap the identified grouping (block 1002) may be performed periodically at set time intervals.

Figure 4:
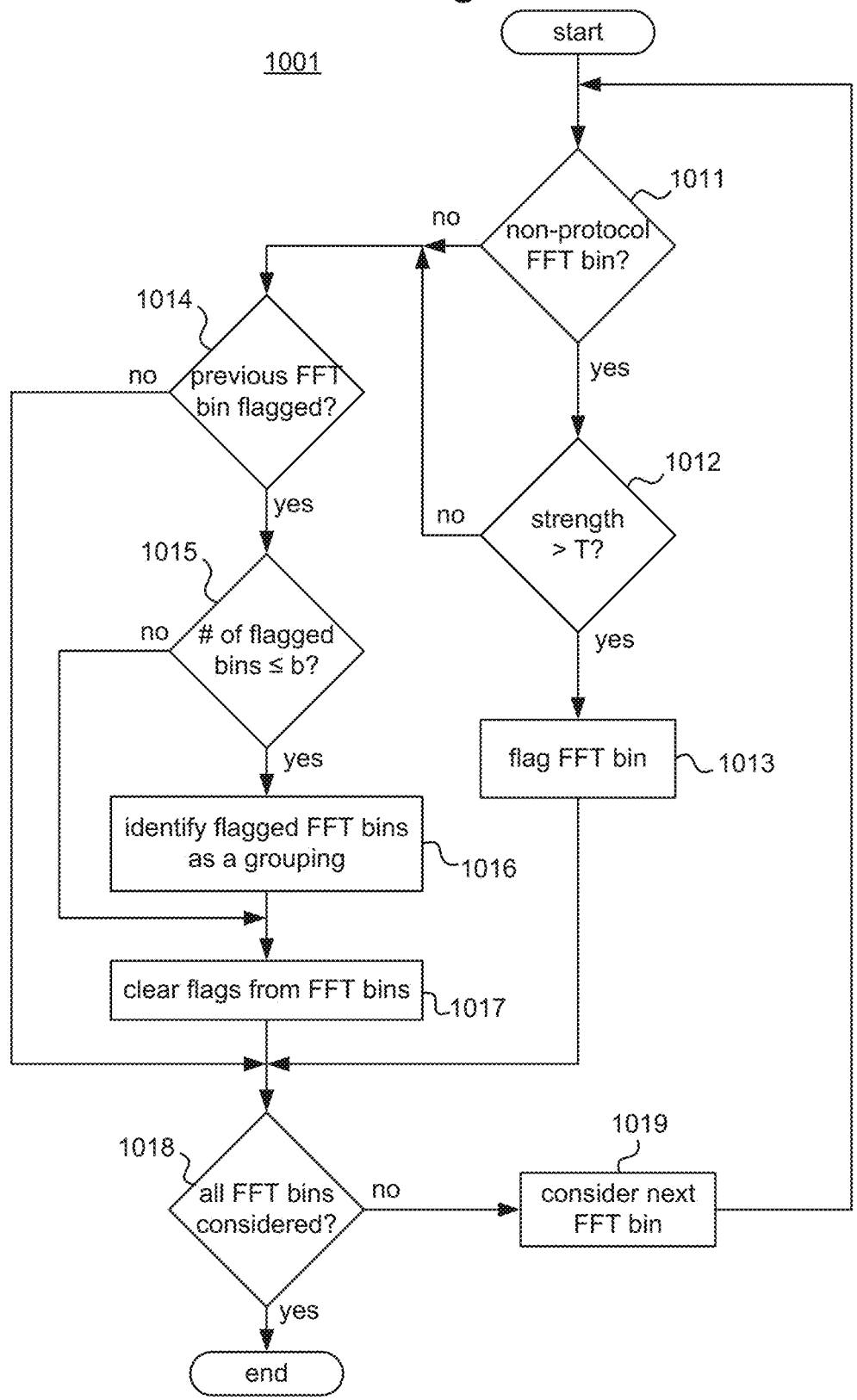
FIG. 4 is a process flow diagram illustrating an example sub-process for identifying groupings as part of the example process of FIG. 3.

FIG. 4 illustrates one example of how the sub-process 1001 from FIG. 3 may be implemented. In the sub-process 1001, the FFT bins are considered sequentially in turn, starting with the lowest FFT bin and working upward or starting with the highest FFT bin and working downward.

In block 1011, a particular FFT bin is considered, and the controller determines whether the bin is a non-protocol FFT bin. If so, the process continues to block 1012. If not, the process continues to block 1014.

In some examples, the non-protocol FFT bins and the protocol FFT bins may already have been sorted prior to the process 1000, and the process 1000 may consider only non-protocol FFT bins. In such examples, block 1011 will always be answered "yes", and therefore the controller does not need to make an explicit determination or perform operations associated with such a determination when block 1011 is reached. In other words, in such examples, the operations associated with block 1011 may be omitted, and instead the process may simply proceed from block 1011 directly to block 1012.

In block 1012, the controller determines whether the signal strength of the FFT bin exceeds the threshold T. If so, the process continues to block 1013. If not the process continues to block 1014.

In block 1013, the controller flags the FFT bin. Note that block 1013 is reached only if the FFT bin is a non-protocol FFT bin and has a signal strength exceeding T. After block 1013, the process continues to block 1018.

In block 1014, the controller determines whether the previous FFT bin has been flagged. If not, then the process continues to block 1018. If so, then the process continues to block 1015.

In block 1015, the controller determines whether the number of currently flagged FFT bins is less than or equal to a threshold b, where b=B/w. If so, then the process continues to block 1016. If not, then the process continues to block 1017.

In block 1016, the controller identifies all of the currently flagged FFT bins as a grouping that satisfies the criteria noted above in relation to block 1001 of FIG. 3. The process then continues to block 1017.

In block 1017, the controller clears the flags from the FFT bins. The process then continues to block 1018.

In block 1018, the controller may determine whether all of the FFT bins have been considered. If so, the process ends. If not the process loops back to block 1011, via block 1019, to consider a next FFT bin.

The process flow diagrams in FIGS. 3 and 4 and the descriptions herein are presented to aid the understanding of the example processes, but are not intended to be exhaustive descriptions thereof. For example, the example processes could include additional operations besides those illustrated in the Figures and described herein. As another example, the example processes could omit certain operations illustrated in the Figures and described herein. Furthermore, the operations are illustrated in a particular order for ease of description, but in practice some operations may be performed concurrently and/or in a different order than that illustrated. In addition, certain operations that were described separately for ease of understanding may, in practice, be performed together as part of a single operation.

4. Example Non-Transitory Machine Readable Media

Figure 6:
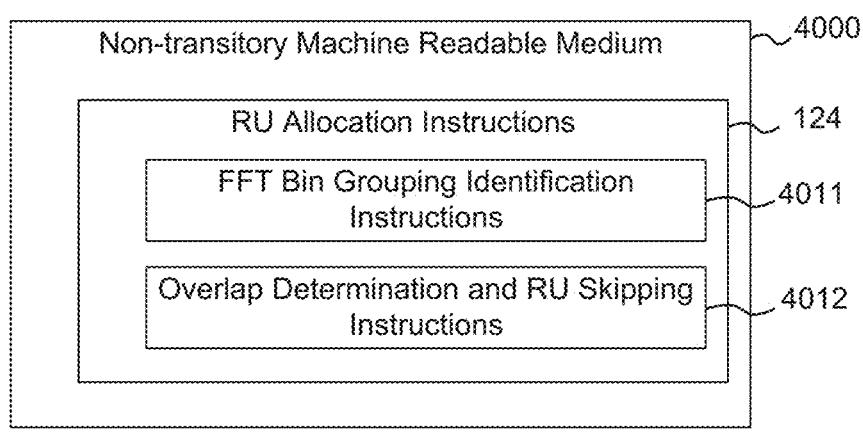
FIG. 6 is a block diagram illustrating an example non-transitory machine readable medium storing example resource unit allocation instructions.

FIG. 6 illustrates an example non-transitory machine readable medium 4000 that stores RU allocation instructions 124. The machine readable medium 4000 may include any non-transitory media that can store instructions and is readable by a machine, such as a memory device (e.g., RAM, persistent memory, USB drive, etc.), a hard disk drive, a solid-state drive, an optical disk (e.g., CD, DVD, Blu-ray, etc.), a magnetic disk, and the like.

The RU allocation instructions 124 may include instructions that are of such a nature that, when they are executed by processing circuitry of a controller that controls an AP, they cause the processing circuitry to perform the operations described above in relation to FIGS. 3 and/or 4. For example, the RU allocation instructions 124 may include FFT bin grouping instructions 4011 and overlap determination and RU skipping instructions 4012. The controller whose processing circuitry executes the RU allocation instructions 124 may be the control circuitry of the individual AP (such as the control circuitry 120 described above), a controller external to the AP (such as the external controller 500 described above), or a virtual controller formed by a distributed system of APs.

The FFT bin grouping instructions 4011 may include instructions to identify groupings of contiguous FFT bins in which: 1) all of the bins are non-protocol FFT bins, 2) all of the bins have signal strength values exceeding a first threshold ("T"); and 3) the bandwidth of the grouping does not exceed a second threshold ("B"). For example, the FFT bin grouping instructions 4011 may include instructions to the operations described above in relation to block 1001 of FIG. 3. As another example, the FFT bin grouping instructions may include instructions to perform the operations described above in relation to FIG. 4.

The overlap determination and RU skipping instructions 4012 may include instructions to determine whether any RUs overlap any of the groupings identified by the FFT bin grouping instructions 4011. The overlap determination and RU skipping instructions 4012 may also include instructions to skip any such RUs when allocating RUs to client devices. For example, the overlap determination and RU skipping instructions 4012 may include operations corresponding to blocks 1002 through 1006 of FIG. 3.

5. Definitions

Some of the electronic devices described above, such as the AP 100, may include some components that may be physical or virtualized, such as a processor of the processing circuitry 121, the storage 123, etc. Generally, for purposes of this disclosure, it does not matter whether the component(s) are physical or virtualized. Accordingly, any references herein and in the appended claims to any components of a device that do not specify "physical" or "virtual" should be understood to admit both physical and virtualized types of the components (in any combination). However, any virtualized component of a device is necessarily virtualized from underlying physical hardware. Accordingly, the recitation herein or in the appended claims of a given component of a device necessarily implies the presence somewhere in the system of physical hardware corresponding to the given component, with the given component either being one-and-the-same as the corresponding physical hardware or being virtualized from the corresponding physical hardware. Note that there is not necessarily a one-to-one ratio between physical hardware and the virtual components virtualized therefrom (one virtual component may span multiple physical components or multiple virtual components may share one physical component).

As used herein, a "processor" may include any logic circuitry that is capable of executing machine readable instructions stored in a non-transitory machine-readable medium (such as the storage 123, an optical disk, a magnetic disk, etc). For example, a "processor" (such as a processor of the processing circuitry 121) may be, for example, a central processing unit (CPU), a microprocessor, a microcontroller, a digital signal processor (DSP), etc.

As used herein, a "coprocessor" is a processor that is configured to supplement the functions of a primary processor. In certain examples, a coprocessor may be controlled by coprocessor instructions that are part of a primary processor's instruction stream. In other examples, a coprocessor may be independent of and capable of working asynchronously with the primary processor.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one item is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

While the above disclosure has been shown and described with reference to the foregoing examples, it should be understood that other forms, details, and implementations may be made without departing from the spirit and scope of this disclosure.

What is claimed is:

1. A wireless access point, comprising:
wireless communications circuitry; and
processing circuitry coupled with the wireless communications circuitry, the processing circuitry configured to:
identify any groupings of subcarriers of a wireless channel in which
all non-protocol Fast Fourier Transform (FFT) bins in the grouping have respective signal strength values exceeding a first threshold, wherein non-protocol FFT bins correspond to bins that contain signals not used in protocols supported by the wireless access point; and
a bandwidth of the grouping does not exceed a second threshold;
identify any resource units of the wireless channel that overlap with any of the identified groupings, wherein resource units comprise non-overlapping groups of subcarriers of the wireless channel; and
in allocating resource units to client devices for an orthogonal frequency division multiple access (OFDMA) communication, skip the identified resource units.

2. The wireless access point of claim 1, wherein the processing circuitry is configured to periodically update the identifications of groupings and periodically update the identifications of resource units.

3. The wireless access point of claim 2, wherein the processing circuitry is configured to skip the currently identified resource units whenever it allocates resource units to client devices for any OFDMA communication.

4. The wireless access point of claim 1, wherein the access point is an 802.11 access point.

5. The wireless access point of claim 1, wherein the access point is an eNodeB.

6. The wireless access point of claim 1, wherein the processing circuitry includes a processor that is configured to identify the resource units by executing machine readable instructions.

7. The wireless access point of claim 1, wherein the processing circuitry includes dedicated hardware that is configured to identify the resource units.

8. A method of controlling a wireless access point, comprising:
causing the wireless access point to identify any groupings of subcarriers of a wireless channel in which
all of the non-protocol Fast Fourier Transform (FFT) bins in the grouping have respective signal strength values exceeding a first threshold, wherein non-protocol FFT bins correspond to bins that contain signals not used in protocols supported by the wireless access point; and
a bandwidth of the grouping does not exceed a second threshold;
causing the wireless access point to identify any resource units of the wireless channel that overlap with any of the identified groupings, wherein resource units comprise non-overlapping groups of subcarriers of the wireless channel; and
causing the wireless access point to, in allocating the resource units to client devices for an orthogonal frequency division multiple access (OFDMA) communication, skip the identified resource units.

9. The method of claim 8, further comprising causing the wireless access point to periodically update the identifications of groupings and periodically update the identifications of resource units.

10. The method of claim 9, further comprising causing the wireless access point to skip the currently identified resource units whenever it allocates resource units to client devices for any OFDMA communication.

11. The method of claim 8, wherein the access point is an 802.11 access point.

12. The method of claim 8, wherein the access point is an eNodeB.

13. The method of claim 8, wherein the method is performed via a controller that is external to the wireless access point.

14. The method of claim 13, wherein the controller is a cloud appliance.

15. The method of claim 8, wherein the method is performed via a virtual controller that is formed by a distributed system of wireless access points, including the wireless access point.

16. A non-transitory machine readable medium comprising instructions that are to, when executed by processing circuitry that controls a wireless access point, cause the processing circuitry to:
identify any groupings of subcarriers of a wireless channel of the wireless access point in which
all of the non-protocol Fast Fourier Transform (FFT) bins in the grouping have respective signal strength values exceeding a first threshold, wherein non-protocol FFT bins correspond to bins that contain signals not used in protocols supported by the wireless access point; and
a bandwidth of the grouping does not exceed a second threshold;
identify any resource units of the wireless channel that overlap with any of the identified groupings, wherein resource units comprise non-overlapping groups of subcarriers of the wireless channel; and cause the wireless access point to, in allocating the resource units to client devices for an orthogonal frequency division multiple access (OFDMA) communication, skip the identified resource units.

17. The non-transitory machine readable medium of claim 16, wherein the instructions are further to cause the processing circuitry to:
periodically update the identifications of groupings and periodically update the identifications of resource units.

18. The non-transitory machine readable medium of claim 17, wherein the instructions are further to cause the processing circuitry to:
cause the wireless access point to skip the currently identified resource units whenever it allocates resource units to client devices for any OFDMA communication.

19. The non-transitory machine readable medium of claim 17, wherein the instructions are further to cause the processing circuitry to:
update the identifications of groupings and/or update the identifications of resource units at specified time intervals.

20. The non-transitory machine readable medium of claim 17, wherein the instructions are further to cause the processing circuitry to:
update the identifications of groupings and/or update the identifications of resource units whenever a new OFDMA communication is to be made.

* * * * *